United States Patent
Goertz (10) Patent No.: US 10,747,524 B2
(45) Date of Patent: Aug. 18, 2020

(54) UPGRADING AN APPLICATION FUNCTION LIBRARY

(71) Applicant: SAP SE, Walldorf (DE)

(72) Inventor: Peter Goertz, Durmersheim (DE)

(73) Assignee: SAP SE, Walldorf (DE)

( * ) Notice: Subject to any disclaimer, the term of this patent is extended or adjusted under 35 U.S.C. 154(b) by 263 days.

(21) Appl. No.: 15/649,334

(22) Filed: Jul. 13, 2017

(65) Prior Publication Data

US 2019/0018665 A1 Jan. 17, 2019

(51) Int. Cl.
*G06F 8/65* (2018.01)
*G06F 9/445* (2018.01)
*G06F 16/951* (2019.01)
*G06F 16/2455* (2019.01)

(52) U.S. Cl.
CPC ............... *G06F 8/65* (2013.01); *G06F 9/445* (2013.01); *G06F 16/24564* (2019.01); *G06F 16/24565* (2019.01); *G06F 16/951* (2019.01)

(58) Field of Classification Search
CPC ......................................... G06F 16/2455–2477
See application file for complete search history.

(56) References Cited

U.S. PATENT DOCUMENTS

| | | | | |
|---|---|---|---|---|
| 2003/0023599 | A1* | 1/2003 | Garcia | G06F 9/465 |
| 2005/0060567 | A1* | 3/2005 | Shannon | G06F 11/0709 |
| | | | | 726/26 |
| 2006/0080683 | A1* | 4/2006 | Anwar | G06F 9/44521 |
| | | | | 719/332 |
| 2008/0162491 | A1* | 7/2008 | Becker | G06F 16/275 |
| 2010/0077378 | A1* | 3/2010 | Maguire | G06F 9/455 |
| | | | | 717/106 |
| 2012/0173581 | A1* | 7/2012 | Hartig | G06F 21/52 |
| | | | | 707/781 |
| 2013/0159966 | A1* | 6/2013 | Goertz | G06F 9/449 |
| | | | | 717/106 |
| 2014/0229462 | A1* | 8/2014 | Lo | G06F 16/951 |
| | | | | 707/707 |

(Continued)

OTHER PUBLICATIONS

Petri, Gregg. "A comparison of Oracle and MYSQL." Select Journal 1 (2005). (Year: 2005).*

(Continued)

*Primary Examiner* — Doon Y Chow
*Assistant Examiner* — Joanne G Macasiano
(74) *Attorney, Agent, or Firm* — Mintz Levin Cohn Ferris Glovsky and Popeo, P.C.

(57) ABSTRACT

In one aspect, there is provided a method. The method may include loading, into a first address space of a primary server of a database, a metadata library of an application function library. The application function library may include an application function for performing operations on data held at the database. The metadata library may include a description of the application function. The primary server may determine, based on the metadata library, that executing a database query requires running the application function. The database query may be routed, based on the determination, to a secondary server of the database. The database query may be routed to trigger a loading the application function library into a second address space of the secondary server. Related methods and articles of manufacture are also provided.

20 Claims, 5 Drawing Sheets

(56) References Cited

U.S. PATENT DOCUMENTS

2014/0358515 A1* 12/2014 Sreedhar ............... G06F 9/4552
                                                          703/26
2018/0089273 A1*  3/2018 Chen ................... G06F 16/2455
2018/0217851 A1*  8/2018 Sirajuddin .......... G06F 9/44521

OTHER PUBLICATIONS

Garcia-Arellano, Christian M., et al. "Autonomic features of the IBM DB2 universal database for linux, UNIX, and windows." IEEE Transactions on Systems, Man, and Cybernetics, Part C (Applications and Reviews) 36.3 (2006): p. 365-376. (Year: 2006).*

* cited by examiner

FIG. 5

UPGRADING AN APPLICATION FUNCTION LIBRARY

TECHNICAL FIELD

The subject matter described herein relates generally to database processing and more specifically to upgrading an application function library.

BACKGROUND

Application functions can be database procedures that can be called to perform a variety of operations on data held in a database. For example, application functions may perform operations that cannot be implemented using structure query language (SQL) scripts and are therefore written in a programming language such as, for example, C++ and/or the like. Multiple application functions can be grouped into a single application function library (AFL). For instance, a predictive analysis library can include application functions that perform predictive analysis, data mining, and/or the like.

SUMMARY

Systems, methods, and articles of manufacture, including computer program products, are provided for upgrading an application function library. In one aspect, there is provided a system. The system may include at least one data processor and at least one memory. The at least one memory may store instructions that result in operations when executed by the at least one data processor. The operations may include: loading, into a first address space of a primary server of a database, a metadata library associated with an application function library, the application function library including an application function for performing one or more operations on data held at the database, and the metadata library including a description of the application function included in the application function library; determining, by the primary server, that executing a database query requires running the application function, the determination based at least on the metadata library; and routing, based at least on the determination, the database query for execution at a secondary server of the database, the database query being routed to at least trigger a loading of the application function library into a second address space of the secondary server.

In some variations, one or more features disclosed herein including the following features can optionally be included in any feasible combination. The secondary server may execute the database query by at least running the application function at the secondary server. An existing version of the metadata library may be unloaded from the first address space without restarting the database. An existing version of the application function library may be unloaded from the second address space without restarting the database.

In some variations, the loading of the metadata library may register the application function as a database procedure at the database. The registration of the application function may add the application function as a database object to a database catalog associated with the database.

In some variations, the database may be a first tenant database in a multitenant database system. The primary server and/or the secondary server may be a first running instance of one or more executables from a kernel of the multitenant database system. The first tenant database may load the metadata library and/or the application function library from a file system of the multitenant database system. An indication to replace an existing version of the metadata library at a second tenant database may be sent to the second tenant database. The second tenant database may include another primary server and another secondary server. The other primary server and/or the other secondary server may be a second running instance of the one or more executables from the kernel of the multitenant database system. In response to the indication, the existing version of the metadata library may be unloaded from a third address space of the other primary server. The existing version of the metadata library may be unloaded without restarting the second tenant database and/or the multitenant database system. The metadata library from the file system of the multitenant database system may be loaded into the third address space. An existing version of the application function library may be unloaded from a fourth address space of the other secondary server. The existing version of the application function may be unloaded without restarting the second tenant database and/or the multitenant database system. The application function library may be loaded into the fourth address space from the file system. The unloading and/or the loading may be responsive to another database query that requires running the application function from the application function library.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A database system may include a primary database server for processing incoming database queries on data held in the database system. The primary database server may respond to these queries by running one or more application functions from an application function library. An application function can be registered as a database procedure before the application function may be called, for example, by the primary database server in response to a database query. Registering the application function typically requires installing a corresponding application function library, which includes loading the entire application function library into the address space of the primary database server. However, due to the complex programming language (e.g., C++) used to create the application function language, loading the application function library into the address space of the primary database server may generate numerous dependencies (e.g., global variables, memory allocations, trace topics, and/or the like) that prevent the application function library from being unloaded. For instance, upgrading an existing application function library may require a full restart of the database system in order to unload the existing application function library from the address space of the primary database server.

As such, in some example embodiments, an application function library may be installed at a database system by loading, into the address space of the primary database server, only a metadata library associated with the application function library. This metadata library may include a description of the application functions included in the application function library. Thus, loading this metadata library may register the application functions included in the application function library as database procedures. However, the metadata library may be unloaded from the address space of the primary database server without a full restart of the database system because loading the metadata library does not generate any dependencies.

The application function library may be loaded into the address space of a secondary database server instead of the address space of the primary database server. According to some example embodiments, the application function library may be loaded on demand. For example, the primary database server may route, to the secondary database server, a database query that requires running one or more application functions from the application function library. The secondary database server may respond to the database query by loading the application function library from a file system of the database system into its address space. Here, unloading the application function library may require only a restart of the secondary database server but not a full restart of the entire database system. Thus, an existing application function library may be upgraded by unloading the metadata library from the address space of the primary database server and unloading the application function library from the address space of the secondary database server, neither of which require a full restart of the database system.

Figure 1:
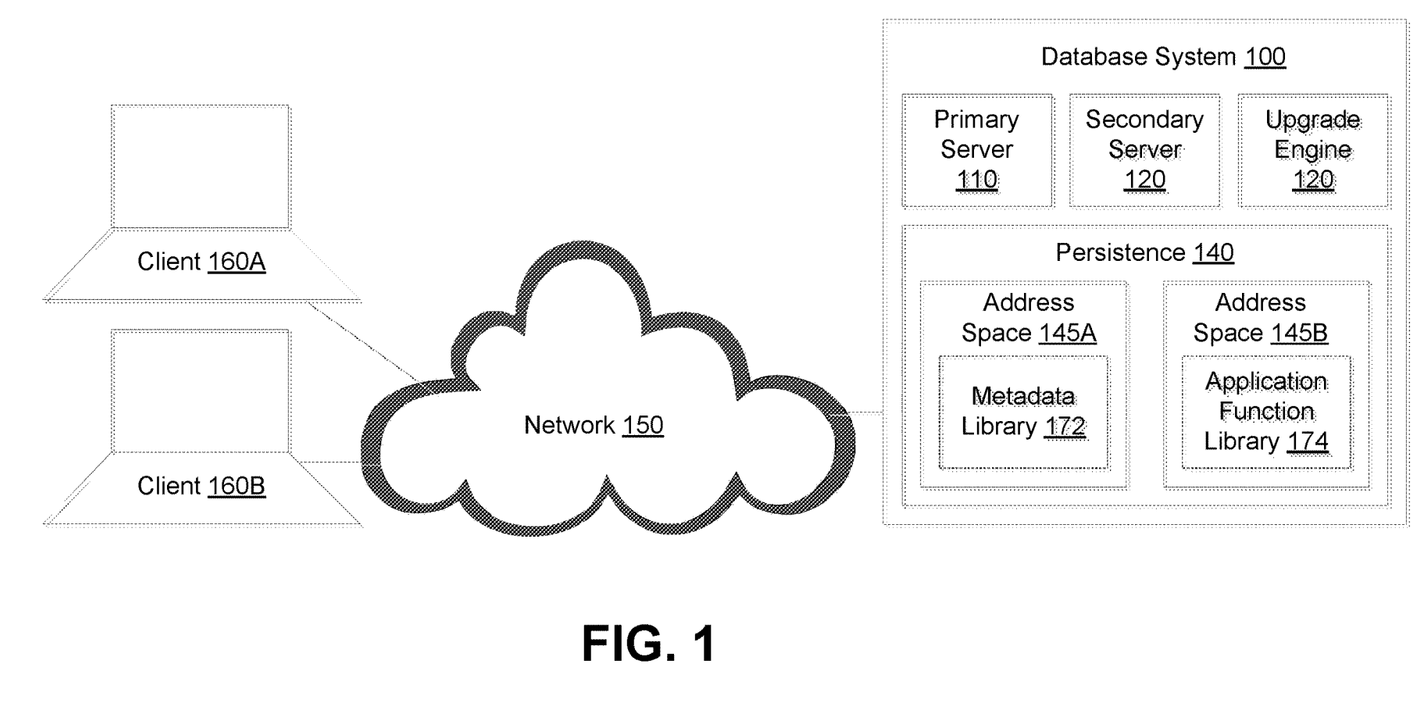
FIG. 1 depicts a system diagram illustrating a database system, in accordance with some example embodiments.

FIG. 1 depicts a system diagram illustrating a database system 100, in accordance with some example embodiments. Referring to FIG. 1, the database system 100 may be any type of database including, for example, an in-memory database, a relational database, a non-SQL (NoSQL) database, and/or the like. As shown in FIG. 1, the database system 100 may include a primary server 110, a secondary server 120, an upgrade engine 130, and a persistence 140. Furthermore, the database system 110 may be communicatively coupled, via a network 150, to a plurality of clients including, for example, a first client 160A and a second client 160B. The network 150 may be a wired and/or wireless network including, for example, a wide area network (WAN), a local area network (LAN), a public land mobile network (PLMN), the Internet, and/or the like.

The primary server 110 and/or the secondary server 120 may be running instances of the corresponding executables (e.g., .exe files) included in a kernel of the database system 100. It should be appreciated that the kernel of the database system 100 may also include other executable (e.g., .exe files) required for running the database system 100. As used here, an executable may be a computer program that have already been compiled into machine language (e.g., binary code) and is therefore capable of being executed directly by a data processor. As shown in FIG. 1, the database system 100 may be a dedicated, single-container database system running a single instance of the primary server 110 and/or the secondary server 120. However, where the database system 100 implements a multitenant database architecture (e.g., multitenant database containers (MDC)), each tenant of the database system 100 may be served by separate instances of the primary server 110 and/or the secondary server 120.

Referring again to FIG. 1, the primary server 110 and the secondary server 120 may be separate servers having different address spaces. For instance, the primary server 110 may be associated with a first address space 145A and the secondary server 120 may be associated with a second address space 145B. As used herein, an address space may refer to a range of memory addresses assigned to a computational entity such as, for example, the primary server 110 and/or the secondary server 120. In some example embodiments, the primary server 110 may be a database index server configured to process incoming database queries. Meanwhile, the secondary server 120 may be a database script server configured to run database procedures. At least some database procedures including, for example, unknown and/or third-party database procedures, may be run on the secondary server 120 instead of the primary server 110 in order to avoid destabilizing the primary server 110 and/or causing a shutdown of the database system 100.

The database system 100 may be configured to process database queries from the first client 160A and/or the second client 160B. Processing these database queries may require running one or more application functions from an application function library 174. For example, the first client 160A and/or the second client 160B can send, to the database system 100, a database query that requires performing a predictive analysis operation on at least a portion of the data held by the database system 100. As such, in some example embodiments, the database system 100 may install the application function library 174 by at least loading, into the first address space 145A associated with the primary server 110, a metadata library 172 of the application function library 174.

In some example embodiments, compiling a descriptor file (e.g., an extensible markup language (XML) descriptor file) of the application function library 174 may generate, as a separate file, the metadata library 172. The metadata library 172 may include a description of the application functions included in the application function library 174. Loading the metadata library 172 into the first address space 145A of the primary server 110 may register, as database procedures, the application functions included in the application function library 174. For example, registering an application function as a database procedure may add the application function as a database object to a database catalog of the database system 100. It should be appreciated that the database catalog of the database system 100 may include definitions of a plurality of database objects including, for example, tables, views, indexes, users groups, procedures, and/or the like.

Once the metadata library 172 is loaded into the first address space 145A of the primary server 110, the application function library 174 may then be loaded on demand. For example, the database system 100 may load the application function library 174 in response to a database query that requires running one or more application functions from the application function library 174. To further illustrate, the database system 100 may receive, from the first client 160A and/or the second client 160B, a database query. To process the database query, the primary server 110 may identify, based at least on the metadata library 172, the one or more application functions from the application function library 174 that is required to execute the database query. The primary server 110 may route the database query to the secondary server 120 for execution. Routing the database query to the secondary server 120 may trigger a loading of the application function library 174 into the second address space 145B associated with the secondary server 120. Here, the secondary server 120 may load the application function library 174 may be loaded into the second address space 145B in order to run the one or more application functions required to execute the database query.

In some example embodiments, the upgrade engine 120 may be configured to perform an add-on upgrade of the application function library 174. The add-on upgrade of the application function library 174 may require replacing an existing version of the metadata library 172 in the first address space 145A of the primary server 110 with an upgraded version of the metadata library 172. For example, the upgrade engine 120 may be configured to upgrade the application function library 174 by at least unloading the existing version of the metadata library 172 from the first address space 145A and loading the upgraded version of the metadata library 172 into the first address space 145A. As noted, unloading the metadata library 172 from the first address space 145A of the primary server 110 does not require a full restart of the database system 100 because loading the metadata library 172 does not generate any dependencies such as, for example, global variables, memory allocations, trace topics, and/or the like.

In some example embodiments, the add-on upgrade of the application function library 174 may further require replacing an existing version of the application function library 174 in the second address space 145B of the secondary server 120. For example, the upgrade engine 120 may further upgrade the application function library 174 by at least unloading the existing version of the application function library 174 from the second address space 145B and loading the upgraded version of the application function library 174 into the second address space 145B. It should be appreciated that the unloading of the existing version of the application function library 174 and/or the loading of the upgraded version of the application function library 174 may be performed on demand such as, for example, when the secondary server 120 is executing a database query that requires running one or more application functions from the application function library 174. Loading the application function library 174 into the second address space 145B may generate one or more dependencies at the secondary server 120 such as, for example, global variables, memory allocations, trace topics, and/or the like. Thus, unloading the application function library 174 from the second address space 145B may require a restart of the secondary server 120. However, the secondary server 120 may be restarted without a full restart of the database system 100. As such, the application function library 174 can be unloaded without a full restart of the database system 100.

Figure 2:
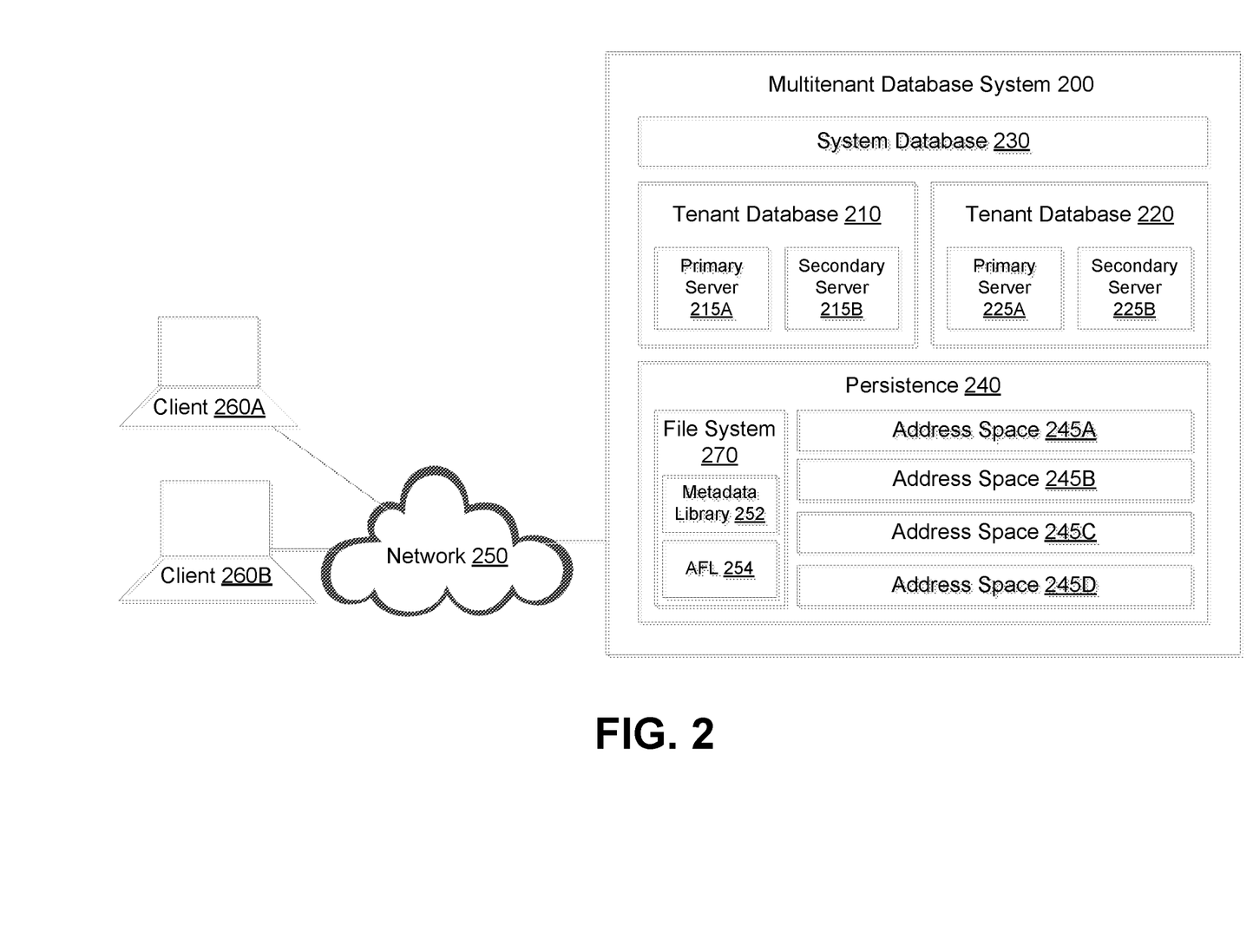
FIG. 2 depicts a system diagram illustrating a multitenant database system, in accordance with some example embodiments.

FIG. 2 depicts a system diagram illustrating a multitenant database system 200, in accordance with some example embodiments. Referring to FIG. 2, the multitenant database 200 may include a plurality of tenant databases including, for example, a first tenant database 210 and a second tenant database 220. The multitenant database 210 may further include a system database 230 configured to orchestrate an add-on upgrade of an application function library 254 across the multitenant database 200. It should be appreciated that the application function library 254 can be loaded at some but not all of the tenant databases within the multitenant database system 200. For instance, the system database 230 can be configured to perform an add-on upgrade of the application function library at the first tenant database 210 but not at the second tenant database 220.

Each tenant database in a multitenant database system may run its own instances of a primary server and a secondary server, which may be executables from a kernel of the multitenant database system. To further illustrate, as shown in FIG. 2, the first tenant database 210 may include a first primary server 215A and a first secondary server 215B. The first primary server 215A and the first secondary server 215B may be running instances of executables from the kernel of the multitenant database system 200. Meanwhile, the second tenant database 220 may include a second primary server 225A and a second secondary server 225B. The second primary server 225A and the second secondary server 225B may also be running instances of executables from the kernel of the multitenant database system 200. It should be appreciated that each tenant database may be associated with more than one instance of a primary server and/or secondary server. Where a tenant database includes multiple primary servers, at least one the primary servers may be designated as a master primary server. The master primary server can coordinate with the system database 230 to perform the add-on upgrade of the application function library 254.

The primary server and the secondary server of a tenant database may each be associated with its own address space, which may be a range of memory addresses from the persistence 240. For example, as shown in FIG. 2, the first primary server 215A of the first tenant database 210 may be associated with a first address space 245A while the first secondary server 215B of the second tenant database 210 may be associated with a second address space 245B. Meanwhile, the second primary server 225A of the second tenant database 220 may be associated with a third address space 245C and the second secondary server 225B of the second tenant database 220 may be associated with a fourth address space 245D.

As noted, the metadata library of an application function library may be loaded into the address space of a primary server while the application function library may be loaded into the address space of a secondary server. Loading the application function library into the address space of the secondary server instead of the address space of the primary server may enable subsequent add-on upgrades to the application function library, which may be performed without a full restart of the multitenant database system. Accordingly, referring again to FIG. 2, the application function library 254 may be loaded into the second address space 245B of the first secondary server 215B and/or the fourth address space 245D of the second secondary server 225B. Meanwhile, a metadata library 252 associated with the application function library 254 may be loaded into the first address space 245A of the first primary server 215A and/or the third address space 245C of the second primary server 215B.

In some example embodiments, the system database 230 may be configured to orchestrate an add-on upgrade of the application function library 254. The system database 230 may load upgraded versions of the application function library 254 and the corresponding metadata library 252 into the persistence 240. For example, the metadata library 252 and the application function library 254 may be stored in a file system 270. The system database 230 may send, to all tenant databases that have loaded the application function library 254, an indication to perform an add-on upgrade of the application function library 254. This request may trigger an unloading of the existing versions of the metadata library 252. For example, the system database 230 may send, to the first tenant database 210 and/or the second tenant database 220, the indication to perform an add-on upgrade. The first tenant database 210 and/or the second tenant database 220 may respond to this indication by at least unloading the existing version of the metadata library 252 from the first address space 245A and/or the third address space 245B. In addition to unloading the existing version of the metadata library 252, the first tenant database 210 and/or the second tenant database 220 can further remove all corresponding catalog objects. It should be appreciated unloading a metadata library from the address space of a primary server of a tenant database does not require a full restart of tenant database or the multitenant database system.

In some example embodiments, the indication from the system database 230 to perform the add-on upgrade may further trigger an unloading of the existing version of the application function library 254. For example, the first tenant database 210 and/or the second tenant database 220 may further respond to the indication by unloading the existing version of the application function library 254 from the second address space 245B and/or the fourth address space 245D. Unloading an application function library from the address space of a secondary server of a tenant database may require only a restart of the secondary server. However, the application function library can be unloaded from the address space of the secondary sever without a full restart of the tenant database or the multitenant database system. It should be appreciated that the existing version of the application function library 254 may also be unloaded on demand such as, for example, when the upgraded version of the application function library 254 is being loaded to execute a database query that requires running one or more application functions from the application function library 254.

In some example embodiments, the system database 230 may propagate the upgraded version of the metadata library 252 to the first tenant database 210 and/or the second tenant database 220. For instance, the system database 230 may send, to the first tenant database 210, another indication to trigger the first tenant database 210 to load the upgraded version of the metadata library 252 into the first address space 245A of the first primary server 215A at the first tenant database 210. The first tenant database 210 may respond to the indication from the system database 230 by at least loading a copy of the upgraded version of the metadata library 252 from the file system 270 into the first address space 245A. Alternatively and/or additionally, the system database 230 may also send an indication to trigger the second tenant database 230 to load the upgraded version of the metadata library 252 into the third address space 245C of the second primary server 225A at the second tenant database 220. The second tenant database 220 may respond to the indication from the system database 230 by at least loading a copy of the upgraded version of the metadata library 252 from the file system 270 into the third address space 245C.

As noted, once the metadata library 252 has been loaded, the upgraded version of application function library 254 may be loaded on demand. For instance, the first tenant database 210 may load a copy of the upgraded version of the application function library 254 from the file system 270 into the second address space 245B of the first secondary server 215B, in response to a database query that requires running one or more application functions from the application function library 254. To further illustrate, the first tenant database 210 may receive, from a first client 260A associated with the first tenant database 210, a database query. The first primary server 215A may process the database query by at least identifying, based at least on the upgraded version of the metadata library 252 loaded in the first address space 245A, the one or more application functions from the application function library 254 required to execute the database query. The first primary server 215A may further trigger a loading of the upgraded version of the application function library 254 by at least routing the database query for execution at the first secondary server 215B. In order to execute the database query, the secondary server 215B may load a copy of the upgraded version of the application function library 254 from the file system 270 into the second address space 245B.

Alternatively and/or additionally, the second tenant database 220 may receive a database query from a second client 260B associated with the second tenant database 220. The second primary server 225A may process this database query by at least identifying, based on the upgraded version of the metadata library 252 loaded in the third address space 245C, one or more application functions from the application function library 254 that is required to execute the database query. The second primary server 225A may trigger a loading of the upgraded version of the application function library 254 by at least routing the database query for execution at the second secondary server 225B. Here, the second secondary server 225B may execute the database query by at least loading a copy of the upgraded version of the application function library 254 from the file system 270 into the fourth address space 245D.

Figure 3:
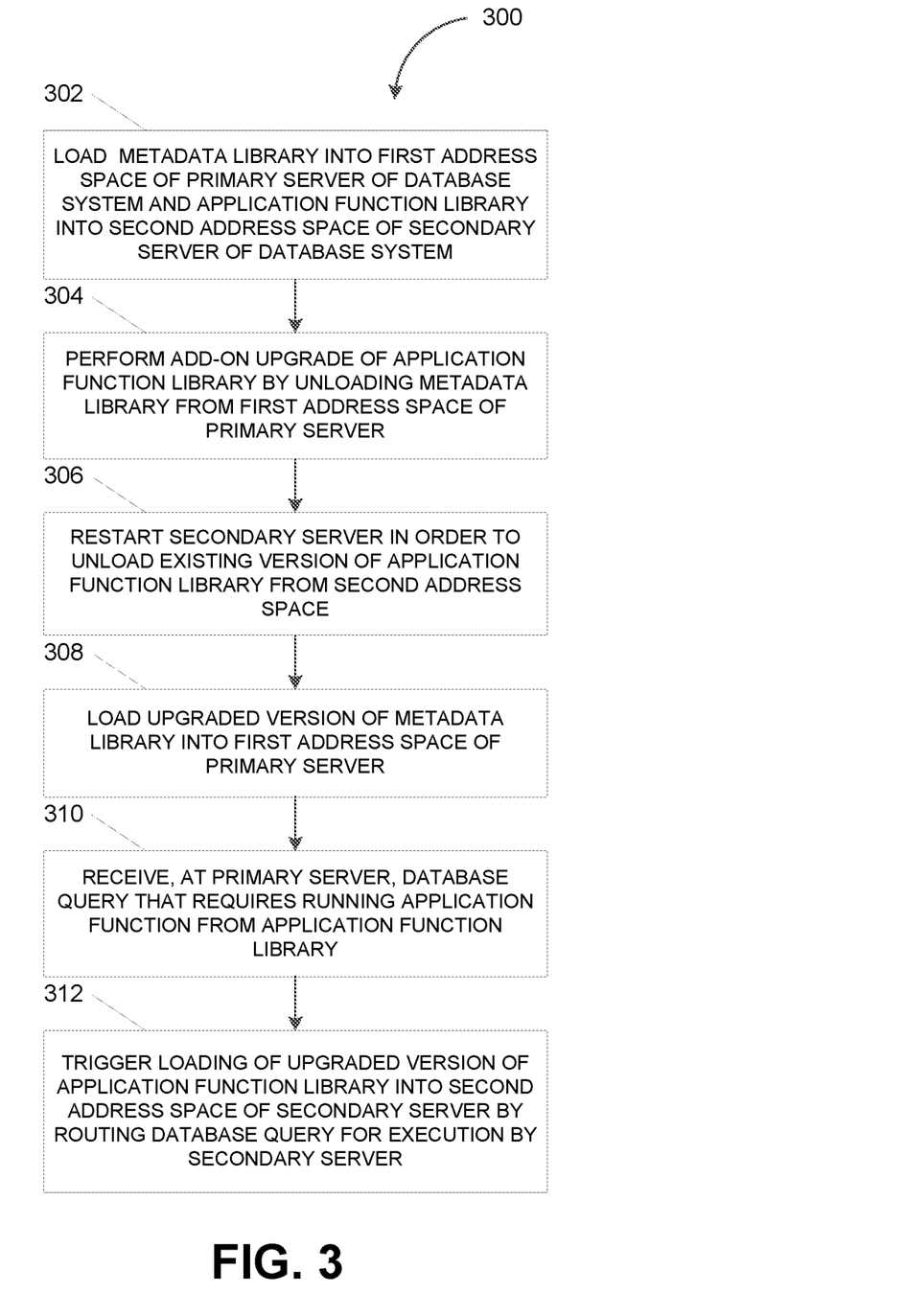
FIG. 3 depicts a flowchart illustrating a process for an add-on upgrade of an application function library, in accordance with some example embodiments.

FIG. 3 depicts a flowchart illustrating a process 300 for an add-on upgrade of an application function library, in accordance with some example embodiments. Referring to FIGS. 1 and 3, the process 300 may be performed by the database system 100 to upgrade the application function library 174.

At 302, the database system 100 may load a metadata library into a first address space of a primary server of the database system 100 and an application function library into a second address space of a secondary server of the database system 100. For example, the database system 100 may load the metadata library 172 into the first address space 145A of the primary server 110. The database system 100 may further load the application function library 174 into the second address space 145B of the secondary server 120. As noted, the application function library 174 may be loaded on demand such as, for example, in response to executing a database query that requires running one or more application functions from the application function library 174.

At 304, the database system 100 may perform an add-on upgrade of the application function library by at least unloading the metadata library from the first address of the primary server. For instance, the database system 100 may perform an add-on upgrade of the application function library 174 by at least unloading an existing version of the metadata library 172 from the first address space 145A. The database system 100 may further remove the database catalog objects corresponding to the existing version of the metadata library 172 as well as any references (e.g., pointers, indexes, and/or the like) to the metadata library 172. As noted, loading the metadata library 172 into the first address space 145A of the primary server 110 may not generate any dependencies such as, for example, global variables, memory allocations, trace topics, and/or the like. Thus, the existing version of the metadata library 172 may be unloaded from the first address space 145A without a full restart of the database system 100.

In some example embodiments, in order to perform the add-on upgrade, the database system 100 may determine that no other add-on upgrades are in progress. The database system 100 may also terminate any application functions from the application function library 174 that are currently running on the database system 100. Furthermore, the database system 100 may verify that the application function library 174 is installed at the database system 100 and that the application function library 174 is enabled for add-on upgrading. It should be appreciated that the database system 100 may determine that the application function library 174 is enabled for add-on upgrading if the application function library 174 is associated with a separate metadata library such as, for example, the metadata library 172. In the absence of the metadata library 172, the application function library 174 must be loaded into the first address space 145A and upgrading the application function library 174 may require a full restart of the database system 100.

At 306, the secondary server may be restarted in order to unload the existing version of the application function library from the second address space of the secondary server. In some example embodiments, the database system 100 may further perform the add-on upgrade of the application function library 174 by at least unloading an existing version of the application function library 174 from the second address space 145B. As noted, unloading the existing version of the application function library 174 from the second address space 145B may require a restart of the secondary server 120. However, it should be appreciated that the existing version of the application function library 174 may be unloaded from the second address space 145B without a full restart of the database system 100.

At 308, the database system 100 may load an upgraded version of the metadata library into the first address space of the primary server. For example, the database system 100 may load an upgraded version of the metadata library 172 into the first address space 145A of the primary server 110. The upgraded version of the metadata library 172 may include a description of the application functions in the upgraded version of the application function library 174. Thus, loading the upgraded version of the metadata library 172 into the first address space 145A may register these application functions and generate corresponding database catalog objects in the database catalog of the database system 100.

At 310, the database system 100 may receive, at the primary server, a database query that requires running an application function from the application function library. As noted, once the upgraded version of the metadata library 172 has been loaded into the first address space 145A of the primary server 110, the upgraded version of the application function library 174 may be loaded on demand. For example, the database system 100 may load the upgraded version of the application function library 174 into the second address space 145B of the secondary server 120 in response to a database query from the first client 160A and/or the second client 160B that requires running one or more application functions from the application function library 174.

At 312, the database system 100 may trigger a loading of an upgraded version of the application function library into the second address space of the secondary server by at least routing the database query for execution by the secondary server. For example, in response to receiving the database query from the first client 160A and/or the second client 160B, the primary server 110 may identify, based at least on the upgraded version of the metadata library 172 loaded into the first address space 145A, the one or more application functions from the application function library 174 required to execute the database query. The primary server 110 may route the database query for execution by the secondary server 120. Once the database query is routed to the secondary server 120, the secondary server 120 may execute the database query by at least loading, into the second address space 145B, the upgraded version of the application function library 174. The upgraded version of the application function library 174 may replace an existing version of the application function library 174, which may be unloaded from the second address space 145B at operation 306. As noted, unloading the application function library 174 from the second address space 145B may require only a restart of the secondary server 120 but not a full restart of the database system 100.

Figure 4:
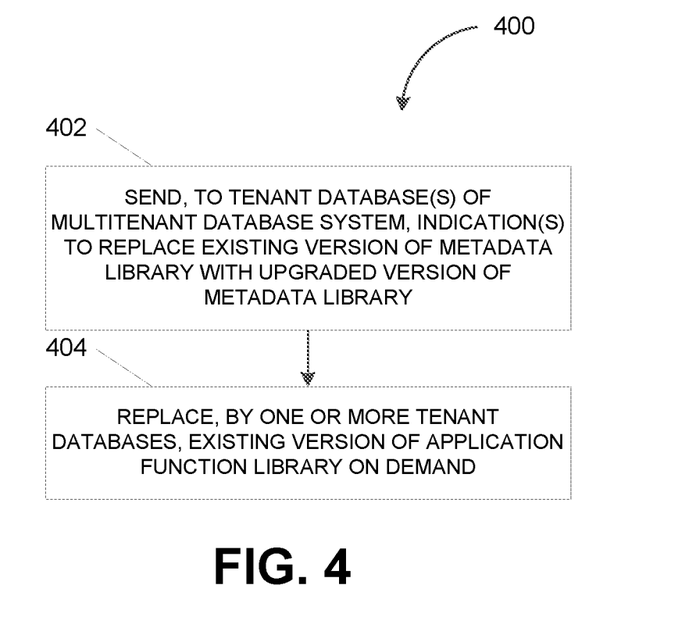
FIG. 4 depicts a flowchart illustrating a process for an add-on upgrade of an application function library in a multitenant database system, in accordance with some example embodiments.

FIG. 4 depicts a flowchart illustrating a process 400 for an add-on upgrade of an application function library in a multitenant database system, in accordance with some example embodiments. Referring to FIGS. 2 and 4, the process 400 may be performed by the multitenant database system 200 to upgrade the application function library 254.

At 402, the multitenant database system 200 may send, to one or more tenant databases of the multitenant database system 200, indications to replace the existing version of the metadata library with the upgraded version of the metadata library. In some example embodiments, the multitenant database 200 may perform an add-on upgrade of the metadata library 252 by at least sending, to the first tenant database 210 and/or the second tenant database 220, an indication to replace the existing version of the metadata library 252 with the upgraded version of the metadata library 254. The first tenant database 210 may respond to the indication from the system database 230 by at least unloading the existing version of the metadata library 252 from the first address space 245A of its first primary server 215A. Furthermore, the first tenant database 210 may load a copy of the upgraded version of the metadata library 252 from the file system 270 into the first address space 245A. Alternatively and/or additionally, the second tenant database 220 may respond to the indication from the system database 230 by at least unloading the existing version of the metadata library 252 from the third address space 245C of its second primary server 225A. The second tenant database 220 may further load a copy of the upgraded version of the metadata library 252 from the file system 270 into the third address space 245C. As noted, the existing version of the metadata library 252 may be unloaded without a full restart of the first tenant database 210, the second tenant database 220, and/or the multitenant database 200.

At 404, the one or more tenant databases may replace the existing version of the application function library on demand. For example, the first tenant database 210 may replace the existing version of the application function library 254 in the second address space 245B of its first secondary server 215B when the first tenant database 210 receives a database query (e.g., from the first client 160A) that requires running one or more application functions from the application function library 254. Likewise, the second tenant database 220 may also replace the existing version of the application function library 254 in the fourth address space 245D of its second secondary server 225B when the second tenant database 220 receives a database query (e.g., from the second client 160B) that requires running one or more application functions from the application function library 254. Replacing the existing version of the application function library 254 may require unloading the existing version of the application function library 254 from the second address space 245B of the first secondary server 215B and/or the fourth address space 245D of the second secondary server 225B. However, as noted, unloading an application function library from the address space of a secondary server may require only a restart of the secondary server. Thus, the existing version of the application function library 254 may be unloaded from the second address space 245B and/or the fourth address space 245D without a full restart of the first tenant database 210, the second tenant database 220, and/or the multitenant database system 200.

Figure 5:
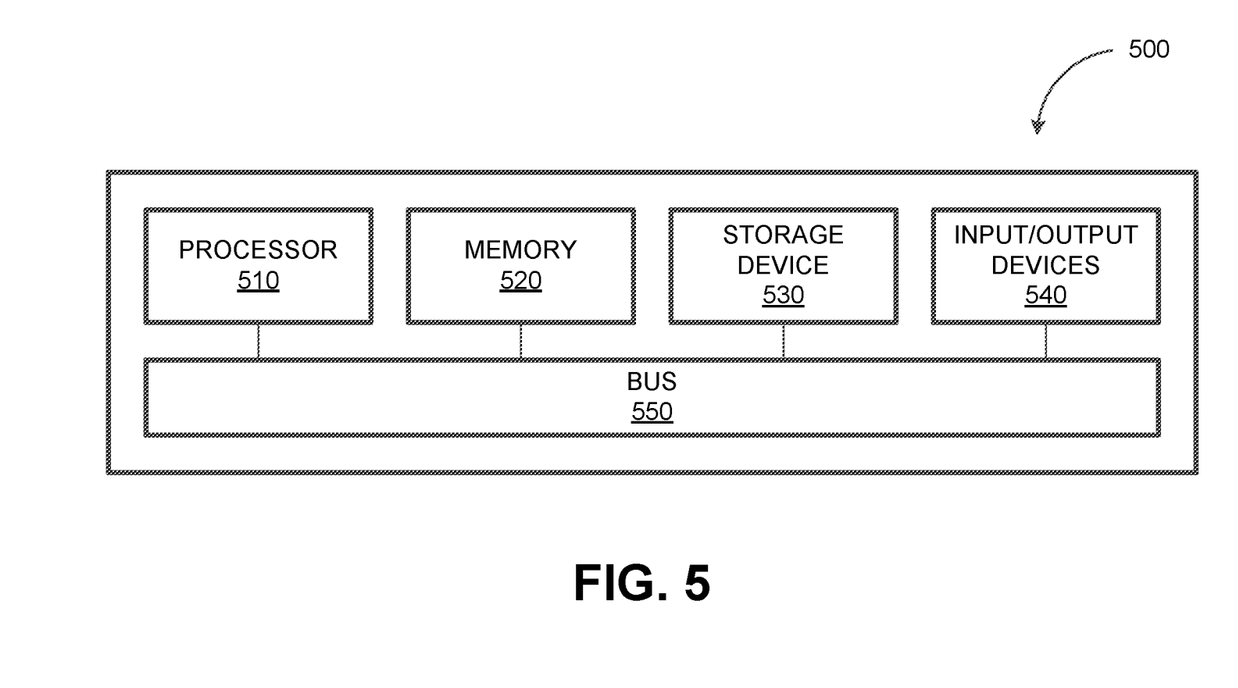
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database system 100, the multitenant database system 200, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database system 100 and/or the multitenant database system 200. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   loading, into a first address space of a primary server of a database, a metadata library associated with an application function library but not the application function library, the application function library including an application function for performing one or more operations on data held at the database, the metadata library including a description of the application function included in the application function library, and the loading of the metadata library associated with the application function library into the first address space of the primary server not generating, at the primary server of the database, one or more dependencies;
   determining, by the primary server, that executing a database query requires running the application function included in the application function library, the determination based at least on the metadata library;
   routing, based at least on the determination, the database query for execution at a secondary server of the database, the database query being routed to at least trigger a loading of the application function library into a second address space of the secondary server, and
   the loading of the application function library into the second address space of the secondary server generating the one or more dependencies at the secondary server; and
   upgrading the application function library without restarting the database, the application function library being upgraded by at least replacing an existing version of the metadata library in the first address space of the primary server with an upgraded version of the metadata library, replacing an existing version of the application function library in the second address space of the secondary server with an upgraded version of the application function library, and restarting the secondary server.

2. The system of claim 1, further comprising:
   executing, by the secondary server, the database query by at least running the application function at the secondary server.

3. The system of claim 1, wherein the existing version of the metadata library is replaced by at least unloading the existing version of the metadata library from the first address space.

4. The system of claim 1, wherein the existing version of the application function library is replaced by at least unloading the existing version of the application function library from the second address space and restarting the secondary server but not the database.

5. The system of claim 1, wherein the loading of the metadata library registers the application function as a database procedure at the database, and wherein the registration of the application function adds the application function as a database object to a database catalog associated with the database.

6. The system of claim 1, wherein the database comprises a first tenant database in a multitenant database system, and wherein the primary server and/or the secondary server comprises a first running instance of one or more executables from a kernel of the multitenant database system.

7. The system of claim 6, wherein the first tenant database loads the metadata library and/or the application function library from a file system of the multitenant database system.

8. The system of claim 7, further comprising:
sending, to a second tenant database, an indication to replace an existing version of the metadata library at the second tenant database, the second tenant database comprising another primary server and another secondary server, and the other primary server and/or the other secondary server comprising a second running instance of the one or more executables from the kernel of the multitenant database system.

9. The system of claim 8, further comprising:
in response to the indication, unloading the existing version of the metadata library from a third address space of the other primary server, the existing version of the metadata library being unloaded without restarting the second tenant database and/or the multitenant database system; and
loading, into the third address space, the metadata library from the file system of the multitenant database system.

10. The system of claim 8, further comprising:
unloading, from a fourth address space of the other secondary server, an existing version of the application function library, the existing version of the application function library being unloaded without restarting the second tenant database and/or the multitenant database system; and
loading, into the fourth address space, the application function library, the application function library being loaded from the file system, and the unloading and/or the loading being responsive to another database query that requires running the application function from the application function library.

11. A computer-implemented method, comprising:
loading, into a first address space of a primary server of a database, a metadata library associated with an application function library but not the application function library, the application function library including an application function for performing one or more operations on data held at the database, the metadata library including a description of the application function included in the application function library, and the loading of the metadata library associated with the application function library into the first address space of the primary server not generating, at the primary server of the database, one or more dependencies;
determining, by the primary server, that executing a database query requires running the application function included in the application function library, the determination based at least on the metadata library;
routing, based at least on the determination, the database query for execution at a secondary server of the database, the database query being routed to at least trigger a loading of the application function library into a second address space of the secondary server, and the loading of the application function library into the second address space of the secondary server generating the one or more dependencies at the secondary server; and
upgrading the application function library without restarting the database, the application function library being upgraded by at least replacing an existing version of the metadata library in the first address space of the primary server with an upgraded version of the metadata library, replacing an existing version of the application function library in the second address space of the secondary server with an upgraded version of the application function library, and restarting the secondary server.

12. The method of claim 11, further comprising:
executing, by the secondary server, the database query by at least running the application function at the secondary server.

13. The method of claim 11, wherein the existing version of the metadata library is replaced by at least unloading the existing version of the metadata library from the first address space.

14. The method of claim 11, wherein the existing version of the application function library is replaced by at least unloading the existing version of the application function library from the second address space and restarting the secondary server but not the database.

15. The method of claim 11, wherein the loading of the metadata library registers the application function as a database procedure at the database, and wherein the registration of the application function adds the application function as a database object to a database catalog associated with the database.

16. The method of claim 11, wherein the database comprises a first tenant database in a multitenant database system, and wherein the primary server and/or the secondary server comprises a first running instance of one or more executables from a kernel of the multitenant database system.

17. The method of claim 16, wherein the first tenant database loads the metadata library and/or the application function library from a file system of the multitenant database system.

18. The method of claim 17, further comprising:
sending, to a second tenant database, an indication to replace an existing version of the metadata library at the second tenant database, the second tenant database comprising another primary server and another secondary server, and the other primary server and/or the other secondary server comprising a second running instance of the one or more executables from the kernel of the multitenant database system.

19. The method of claim 18, further comprising:
in response to the indication, unloading the existing version of the metadata library from a third address space of the other primary server, the existing version of the metadata library being unloaded without restarting the second tenant database and/or the multitenant database system;
loading, into the third address space, the metadata library from the file system of the multitenant database system;
unloading, from a fourth address space of the other secondary server, an existing version of the application function library, the existing version of the application function library being unloaded without restarting the second tenant database and/or the multitenant database system; and loading, into the fourth address space, the application function library, the application function library being loaded from the file system, and the unloading and/or the loading being responsive to another database query that requires running the application function from the application function library.

20. A non-transitory computer-readable storage medium including program code, which when executed by at least one data processor, cause operations comprising:

loading, into a first address space of a primary server of a database, a metadata library associated with an application function library but not the application function library, the application function library including an application function for performing one or more operations on data held at the database, the metadata library including a description of the application function included in the application function library, and the loading of the metadata library associated with the application function library into the first address space of the primary server not generating, at the primary server of the database, one or more dependencies;

determining, by the primary server, that executing a database query requires running the application function included in the application function library, the determination based at least on the metadata library;

routing, based at least on the determination, the database query for execution at a secondary server of the database, the database query being routed to at least trigger a loading of the application function library into a second address space of the secondary server, and the loading of the application function library into the second address space of the secondary server generating the one or more dependencies at the secondary server; and upgrading the application function library without restarting the database, the application function library being upgraded by at least replacing an existing version of the metadata library in the first address space of the primary server with an upgraded version of the metadata library, replacing an existing version of the application function library in the second address space of the secondary server with an upgraded version of the application function library, and restarting the secondary server.

* * * * *